P. REINHALTER.
HANDLE ATTACHMENT FOR SCREWDRIVERS.
APPLICATION FILED SEPT. 15, 1920.
1,379,125. Patented May 24, 1921.
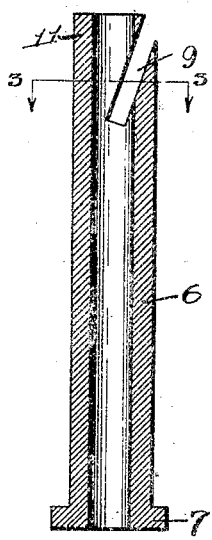
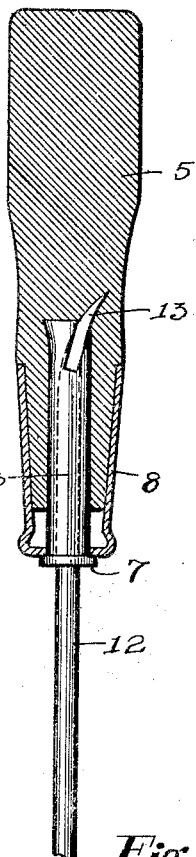
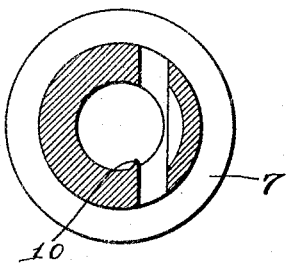
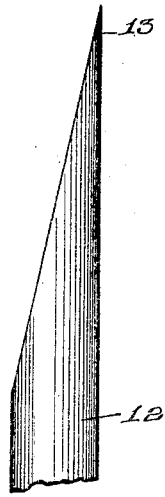
Inventor
P. Reinhalter
By C. A. Snow & Co.
Attorneys

UNITED STATES PATENT OFFICE.

PETER REINHALTER, OF WILKES-BARRE, PENNSYLVANIA, ASSIGNOR TO PETER REINHALTER CO., OF WILKES-BARRE, PENNSYLVANIA.

HANDLE ATTACHMENT FOR SCREWDRIVERS.

1,379,125.     Specification of Letters Patent.     Patented May 24, 1921.

Application filed September 15, 1920. Serial No. 410,375.

*To all whom it may concern:*

Be it known that I, PETER REINHALTER, a citizen of the United States, residing at Wilkes-Barre, in the county of Luzerne and State of Pennsylvania, have invented a new and useful Handle Attachment for Screwdrivers, of which the following is a specification.

The present invention has reference to screw drivers, and it is an object of the invention to provide a novel means for securing the handle to the shank thereof, in a manner to prevent rotary movement of the handle with relation to the shank.

A further object of the invention is to provide a device of this character wherein the shank of the driver automatically embeds itself within the wooden handle, when the shank is positioned in the handle.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 illustrates a longitudinal sectional view through the tubular member forming a part of the invention.

Fig. 2 illustrates a longitudinal sectional view through a handle showing the tubular member and shank as applied thereto, the tubular member being partly broken away to illustrate the relation between the tang of the shank and the handle.

Fig. 3 illustrates a transverse sectional view through the tubular member, on line 3—3 of Fig. 1.

Fig. 4 illustrates a fragmental end elevational view disclosing the tang.

Having reference to the drawing in detail, the handle of the screw driver is indicated at 5, which is provided with an opening extending from one end thereof and terminating at a point substantially intermediate the ends of the handle portion, the opening being designed to accommodate the tubular member 6, which forms an important feature of the invention.

This tubular member 6 is provided with a circumferential flange 7 designed to engage one end of the ferrule 8 to restrict movement thereof with relation to the handle portion when the same is being positioned therein, and as shown, this tubular member is provided with a diagonally disposed slot 9 formed in a manner to provide an inwardly extending roughened edge 10 for purposes to be hereinafter more fully described, the slot 9, partially separating the end 11 from the body portion of the tubular member so that the same will be moved outwardly when the tang of the blade is forced therein.

The blade or shank indicated at 12 is provided with a tapered portion 13 so that when the shank is driven into the tubular member 6 the tapered portion 13 thereof will contact with the roughened edge 10 to cause the same to be forced outwardly into the slotted portion 9 where the same wedges its way between the walls of the slot 9, forcing the end 11 laterally into the wood of the handle, while the tang moves into the wooden portion of the handle at a point directly opposite from where the end 11 is disposed.

From the foregoing it is obvious that when the shank is forced into the tubular member and the tang thereof takes a position more clearly shown by Fig. 2 of the drawing, the shank is anchored in such position, and rotary movement of the handle with relation to the shank is absolutely prevented.

Having thus described the invention, what is claimed as new is:—

1. In a tool, a handle having an opening in one end thereof, a tubular member positioned in the opening, said tubular member having a diagonally disposed slot formed adjacent one end thereof, one of the walls of the slot having a roughened edge, a tool shank having a tang, said tang adapted to engage the roughened edge to cause the tang to pass through the slot and be embedded in the handle.

2. In a tool, a handle having an opening in one end thereof, a tubular member positioned within the handle, said tubular member having a lateral opening, a shank having a tang at one end thereof, said tang adapted to be cammed through the opening in the tubular member, where the same embeds itself within the handle portion, and said tang adapted to move a portion of the tubular member laterally.

In testimony that I claim the foregoing as my own, I have hereto affixed my signature.

PETER REINHALTER.